J. ROBB.
Corn Sheller.
No. 13,997.
Patented Dec. 25, 1855.
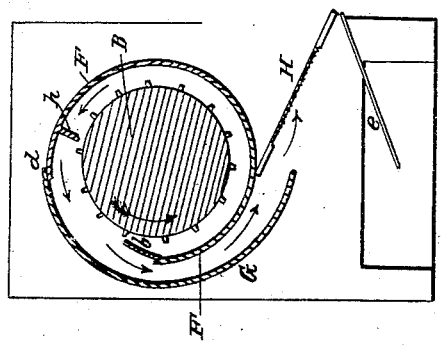
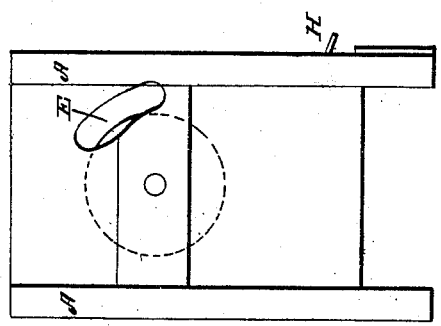
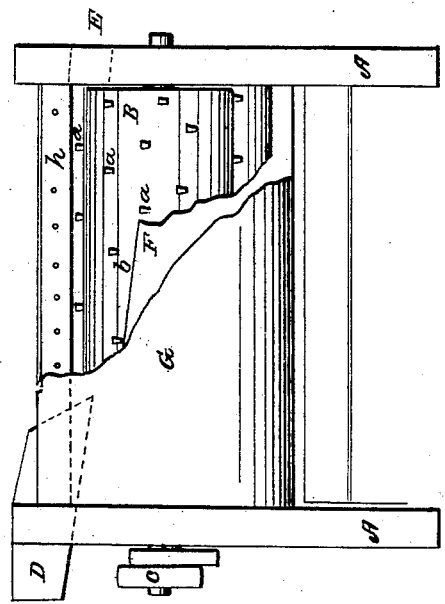

UNITED STATES PATENT OFFICE.

JAMES ROBB, OF LEWISTOWN, PENNSYLVANIA.

CORN-SHELLER.

Specification of Letters Patent No. 13,997, dated December 25, 1855.

*To all whom it may concern:*

Be it known that I, JAMES ROBB, of Lewistown, in the county of Mifflin and State of Pennsylvania, have invented certain new and useful Improvements in Corn Shellers and Cleaners; and I do hereby declare that the following is a full, clear, and exact description thereof, reference being had to the accompanying drawings, forming a portion of this specification.

To enable others skilled in the art to make and use my invention I will describe it as follows.

A, A, are upright framing supporting a cylinder B, armed with projecting teeth or spikes $a$, $a$, set in spiral lines, for the purpose of moving the cob from one end to the other of the machine; instead of spikes, bars or beaters set spirally may be used.

C, is a pulley on the shaft of the cylinder, over which a driving band may be passed.

D, is a hopper at one end of the cylinder, and E an opening in the opposite end for the discharge of the cobs.

F is a concave embracing about three fourths of the cylinder B; at one of its edges $b$, it is curved, so as to bring the edge as close as possible to the teeth of the cylinder, without touching, for the purpose of delivering the blast, created by the revolving cylinder over the curved edge and outside of the concave F.

G is a hood or casing, joining the concave at its upper edge $d$ and covering the lower edge thereof, so as to leave sufficient space for the blast to pass between the concave F and casing G (see darts.)

H is a shake riddle operated by a cam on the cylinder shaft. It is so placed as to receive the blast from the space above described, and delineated in the drawings, the mesh of the wire gauze permitting the shelled corn to pass through the riddle, and the blast, while the broken cob, and filth is blown in front.

$e$ is a grain board placed under the riddle. The lower portion of the concave, over the riddle is perforated with a sufficient number of holes to permit the shelled corn and any chaff to pass out of the machine.

The operation is as follows: The corn being received at the hopper end of the cylinder (made larger than the discharge end,) is drawn by the cylinder B revolving in the direction of the dart and shelled, between it and the concave F. The cobs instead of passing around in continuous circles are arrested by the fender board or cob arrester $h$, extending from end, to end, of the concave, by which they are thrown back, or made to rebound, until divested of the grain, and ultimately by the spiral action of the teeth of the cylinder, delivered at the cob opening E. This fender board is perforated with numerous holes, for the purpose of permitting the blast, freely to pass through it, and yet stop the cob. In shelling new or damp corn, this fender board is important as it serves to hold the cob loosely against the revolving cylinder, without material loss of power.

By my mode of creating the blast by the cylinder and the after gathering, and conducting it by the hood or casing G, immediately under the riddle, I dispense with a very considerable portion of the expense in constructing operating fans, and loss of power consequent in driving them.

It will be noticed that after a few shovelfuls of ears are thrown in, that the cobs and corn partially fill the space between the cylinder and concave and thus prevent the blast from following the cylinder, and consequently it is drawn and directed over the curved edge $s$ of the concave as beore described.

Having fully described my improvements in corn shellers and cleaners, what I claim as my invention and desire to secure by Letters Patent is—

The hood or casing G in combination with the concave F, fender board or cob arrester $h$, and cylinder B for the purpose of directing a blast and separating or cleaning the corn and cob, substantially in the manner described.

In testimony whereof I have hereunto signed my name before two subscribing witnesses.

JAMES ROBB.

Witnesses:
W. S. CLARK,
JOHN S. HOLLINSHEAD.